UNITED STATES PATENT OFFICE.

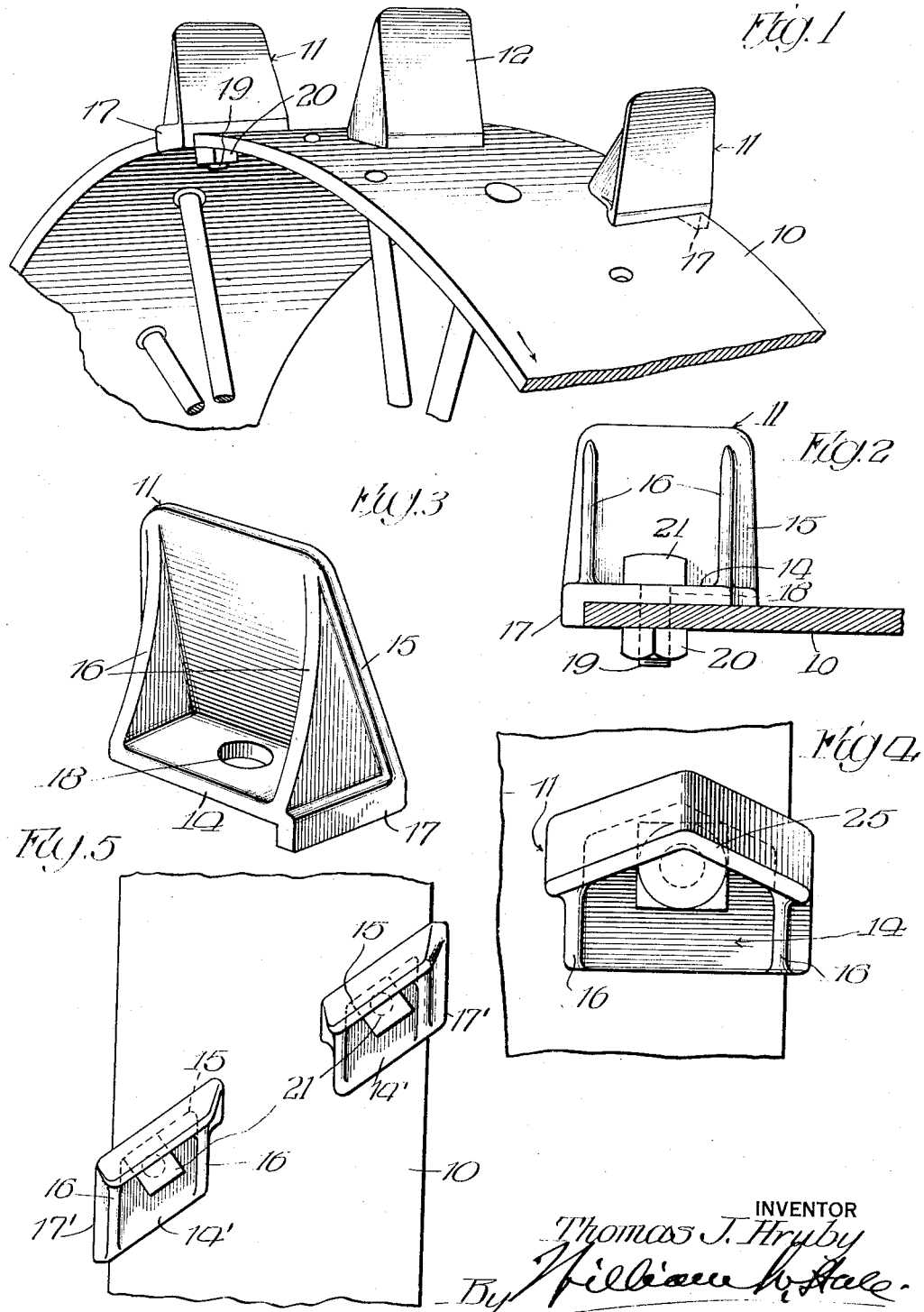

THOMAS J. HRUBY, OF CHICAGO, ILLINOIS.

TRACTION-WHEEL LUG.

1,406,562.  Specification of Letters Patent.  Patented Feb. 14, 1922.

Application filed October 23, 1918. Serial No. 259,340.

*To all whom it may concern:*

Be it known that I, THOMAS J. HRUBY, a citizen of the United States, and a resident of Chicago, in the county of Cook and State of Illinois, have invented certain new and useful Improvements in Traction-Wheel Lugs; and I do hereby declare that the following is a full, clear, and exact description thereof, reference being had to the accompanying drawings, and to the characters of reference marked thereon, which form a part of this specification.

This invention relates to improvements in tread structures for vehicle wheels, more especially adaptable to agricultural vehicle wheels, and the invention refers more specifically to detachable tread structures in the nature of so-called "spade" lugs that are fitted to the wheel rim and have means to detachably connect them to the rim so that they may be readily attached to and removed from the rim.

Among the objects of the invention is to provide an exceedingly simple and efficient detachable tread structure for vehicle wheels of that character wherein the spade elements or lugs are separately attached to and are detachable from the rim.

Another object of the invention is to provide a rugged lug element of this character.

A further object of the invention is to provide means for attaching a lug element of this general character to a wheel rim by means which will hold the lug element in place.

Other objects of the invention are to improve and simplify tread structures for vehicle wheels, and the invention consists in the combination and arrangement of the parts shown in the drawings and described in the specification, and is pointed out in the appended claim.

In the drawings, illustrating one embodiment of the invention,—

Figure 1 is a perspective view of a portion of a wheel rim showing my improved spade lugs applied thereto.

Figure 2 is a section through the rim showing a lug in rear elevation.

Figure 3 is a perspective view of one of the lugs.

Figure 4 is a top plan view of a modified form of lug and a portion of the rim.

Figure 5 is a fragmentary view of a wheel rim showing still another modification of the lug.

As shown in the drawings (Figures 1, 2, and 3), 10 designates the wheel rim and 11, 12 designate the lugs detachably applied thereto. The form of the lugs 11 is shown in Figures 2 and 3. They are right and left handed lugs, to be applied to the right and left hand margins of the rim, as hereinafter set forth.

Each said lugs comprises a base 14 shaped to fit the outer face of the rim and a salient portion 15 made integral with the base. Said salient portion 15 constitutes the "spade" element of the lug and is braced from the base by integral brace members 16. The said spade members 15 are preferably inclined to a radial plane passed through the center of the wheel, the inclination being in a direction away from that of the rotation of the wheel.

The elements 11, 11 (right and left handed to fit opposite edges of the rim) are provided with marginal flanges or shoulders 17 to engage over the edges of the rim. Each said lugs 11 is provided with an opening 18 through which extends a headed fastening bolt 19 threaded to receive, inside the rim 10, a holding nut 20 (Figures 1 and 2).

The brace flanges 16 serve, in connection with the spade members 15 and the base members 14 of the lugs 11 to strengthen the lugs to give the desired rigidity or ruggedness thereto. The flanges or shoulders 17 that engage the edges of the rim 10 serve, in connection with the bolts 19 to prevent said lugs 11, 11 from turning about the axes of said bolts 19, whereby the lugs are held fixedly in place. Preferably, and in practice, the heads 21 of the bolts 19 are square so that one flat face of each bolt head engages the rear flat face of the wall 15 of the lug to further avoid twisting of the lugs on the rim.

As shown in Figure 4, the front face of the spade member of the lug is composed of two members disposed at oblique angles to each other in respect of the vertical plane of the wheel rim. Such obliquely disposed faces are expected to be self-cleaning to an extent greater than the plane faces shown in Figures 1, 2, and 3.

In the construction shown in Figure 5, the rim edge engaging shoulders or flanges 17' of the bases 14' are disposed at such oblique angles to the bases of the lugs that, when fitted and bolted to the rim they are arranged at oblique angles to a vertical plane passed through the rim, so as to thereby afford another means of self-cleaning the lugs. The construction of the lugs shown in Figure 5, in other respects, is the same as hereinbefore described.

In all of the construction described, the principal of the rim edge engaging hooks cooperating with bolts, for the side lugs, is observed, and so far as the broader phases of the invention are concerned the structural details may be varied from those shown.

I claim as my invention:

A spade type lug for tractor wheels adapted to be fitted to the wheel rim adjacent to its margin by the use of a single bolt opening at said margin, comprising a spade-like salient and an integral base adapted to fit the tread face of the wheel rim, said base being provided with a single bolt hole and formed at its one outer side edge adjacent to said bolt hole with an inwardly directed flange formed with a plain straight face adapted for full contact with the edge faces of wheel rims of different thicknesses and adapted to coact with a single bolt to hold the lug on a wheel rim.

In testimony whereof I claim the foregoing as my invention, I hereunto append my signature at Chicago, Illinois, this nineteenth day of October, 1918.

THOMAS J. HRUBY.